UNITED STATES PATENT OFFICE.

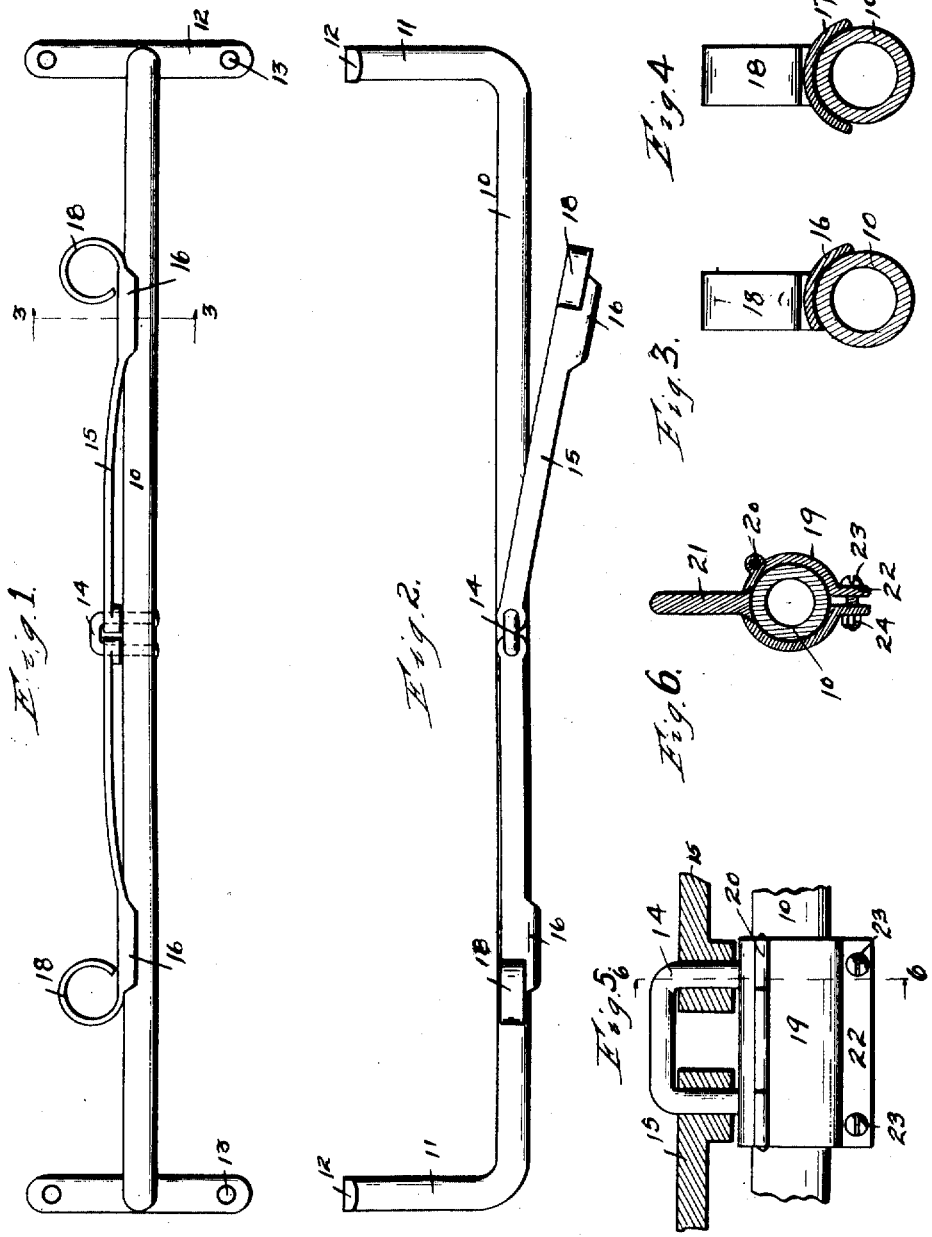

THOMAS J. SHERMAN, OF BILLINGS, MONTANA.

TOWEL-HOLDER.

1,227,965.    Specification of Letters Patent.    Patented May 29, 1917.

Application filed May 11, 1916. Serial No. 96,798.

*To all whom it may concern:*

Be it known that I, THOMAS J. SHERMAN, a citizen of the United States, and resident of Billings, in the county of Yellowstone and State of Montana, have invented a certain new and useful Towel-Holder, of which the following is a specification.

The object of my invention is to provide a towel holder of simple, durable and inexpensive construction.

A further object is to provide a towel holder comprising a rod adapted to be mounted on any suitable support, and having a resilient arm pivotally secured thereon, so as to be swung from position with its free end out of engagement with the rod, to position where its free end is yieldingly held in engagement with the rod for holding a towel thereon.

My invention consists in the construction, arrangement and combination of the various parts of the device, whereby the objects contemplated are attained, as hereinafter more fully set forth, pointed out in my claim, and illustrated in the accompanying drawings, in which:

Figure 1 shows a front elevation of a towel holder embodying my invention.

Fig. 2 shows a top or plan view of the same.

Fig. 3 shows a vertical, sectional view taken on the line 3—3 of Fig. 1.

Fig. 4 shows a view similar to that shown in Fig. 3 of a slightly modified form of my device.

Fig. 5 shows a front elevation of the preferred form of the device, and

Fig. 6 shows a vertical, sectional view taken on the line 6—6 of Fig. 5.

In the accompanying drawings, I have used the reference numeral 10 to indicate generally a horizontal rod having at its ends the rearward extensions 12 provided with openings 13 receiving screws or the like for fastening the device on the wall.

In Figs. 1 and 2, I have shown a simple form of my device comprising a U-bolt 14 having its arms extended downwardly through the rod 10 and secured thereto.

Pivotally mounted on the arms of the U-bolt are resilient arms 15 pivoted to swing in a substantially horizontal plane.

The outer ends of the arms 15 are curved slightly downwardly and are provided with curved engaging members 16, shown in Figs. 1 and 3.

In Fig. 4, I have shown a slightly modified form of the engaging member indicated by the reference character 17 in which both edges extend downwardly from the rod 10 when the member 16 is directly over the rod.

Formed on each member 16 or 17, as the case may be, is a handle 18.

In Figs. 5 and 6, I have shown the preferred form of my device which is so arranged that the engaging device may be attached on a rod and used as an attachment. The device, as shown in Figs. 5 and 6, comprises a cylindrical member 19 made in two parts hinged on a horizontal line at 20 and adapted to receive between them the rod 10. A U-shaped member 21 is arranged with its lower ends secured to one part of the cylindrical member 19.

The parts of the cylindrical member 19 are provided with free edges on which are formed downwardly extending flanges 22, which may be secured together by screw-bolts 23 on which are the nuts 24.

It will be seen that by adjusting the bolts 23 and nuts 24, the cylindrical member can be adjusted to fit it on rods 10 of different sizes. The cylindrical member can also be readily adjusted longitudinally on the rod 10.

The resilient arms 15, such as those which have been described, are secured to the arms of the U-shaped member 21.

In the practical operation of my improved towel holder, the towel may be slipped under the engaging member 16 from the free end thereof, or if desired, the handle 18 may be grasped for slightly raising the member 16 and then swinging the arm 15 laterally. When this has been done a towel may be laid over the rod 10 and the arm 15 and engaging member 16 moved back to position directly above the rod 10, whereupon the engaging member 16 will be pressed against the towel by the resiliency of the arm 15 for holding the towel between the member 16 and the rod 10.

In the form of the engaging device shown in Figs. 2 and 3 it will be seen that the member 16 extends downwardly over the rod 10 on one side, farther than it does on the other side.

In the form of the members shown in Fig. 4 the side edges of the member 17 extend slightly downwardly from the rod 10 on both sides thereof, so that in drawing a towel from the holder, the member 17 will not be pulled away by swinging the arm 15 on its pivot.

The preferred form of the device shown in Figs. 5 and 6 may be readily used and sold purely as an attachment, and it will be seen that this form of device can be quickly and easily installed on or removed from an ordinary towel rack rod.

The device is comparatively inexpensive to manufacture and is of simple construction.

Changes may be made in the construction and arrangement of the parts of my device without departing from its essential features and purposes, and it is my intention to cover by this application any such modifications of structure as may be reasonably included within the scope of my claim.

I claim as my invention:

In a device of the class described, the combination of a rod with a two-part cylindrical member hinged together at adjacent edges, means for adjustably fastening the free edges of said parts together, an inverted U-shaped member secured to said cylindrical member and extending upwardly therefrom, arms pivotally mounted on the upright portions of said U-shaped member said arms being made of resilient material, engaging portions at the outer ends of said arms, the parts being so connected and arranged that when the arms are above said rod, said engaging members will be yieldingly pressed toward the rod.

Des Moines, Iowa, April 6, 1916.

THOMAS J. SHERMAN.